United States Patent
Okamoto et al.

(10) Patent No.: US 9,169,079 B2
(45) Date of Patent: Oct. 27, 2015

(54) CONVEYANCE DEVICE

(75) Inventors: Mitsuyoshi Okamoto, Toyota (JP); Kazunaka Nishitsuji, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/239,440

(22) PCT Filed: Aug. 23, 2011

(86) PCT No.: PCT/JP2011/068948
§ 371 (c)(1),
(2), (4) Date: Feb. 18, 2014

(87) PCT Pub. No.: WO2013/027264
PCT Pub. Date: Feb. 28, 2013

(65) Prior Publication Data
US 2014/0216899 A1    Aug. 7, 2014

(51) Int. Cl.
*B65G 13/06* (2006.01)
*B65G 39/02* (2006.01)
*B65G 13/02* (2006.01)

(52) U.S. Cl.
CPC ............... *B65G 39/02* (2013.01); *B65G 13/02* (2013.01); *B65G 2812/00* (2013.01)

(58) Field of Classification Search
CPC ......... B65G 17/24; B65G 19/02; B65G 13/06
USPC ......................................... 198/780, 782, 817
See application file for complete search history.

(56) References Cited

U.S. PATENT DOCUMENTS

| 4,815,588 | A  | * | 3/1989  | Katsuragi et al. | ........ | 198/781.04 |
| 4,844,231 | A  | * | 7/1989  | Usui             | ......... | 198/345.3  |
| 5,090,558 | A  |   | 2/1992  | Hatouchi         |          |            |
| 6,471,045 | B1 | * | 10/2002 | Harden           | ......... | 198/817    |
| 6,729,463 | B2 | * | 5/2004  | Pfeiffer         | ......... | 198/460.1  |
| 7,748,520 | B1 | * | 7/2010  | Helgerson et al. | ........ | 198/781.03 |

FOREIGN PATENT DOCUMENTS

| JP | H07187360   | A | 7/1995 |
| JP | H0930630    | A | 2/1997 |
| JP | H11138338   | A | 5/1999 |
| JP | 2000103509  | A | 4/2000 |
| JP | 2002036026  | A | 2/2002 |
| JP | 2003-104534 | A | 4/2003 |
| JP | 2009-137688 | A | 6/2009 |

* cited by examiner

*Primary Examiner* — James R Bidwell
(74) *Attorney, Agent, or Firm* — Kenyon & Kenyon LLP

(57) ABSTRACT

The conveyance rollers are arranged at a predetermined roller pitch in the conveyance direction and arranged in rows so as to be capable of supporting at least the side ends of an object being conveyed. The conveyance rollers are formed along the conveyance direction by a repetition unit composed of the drive rollers and the free rollers. The roller pitch of the conveyance rollers is set based on the dimension of the object, and the smaller of distances from respective ends in the conveyance direction of the object to the position of the center of gravity of the object. The arrangement ratio of the drive rollers in the conveyance rollers is set based on the smaller of the distances from the respective ends in the conveyance direction of the object to the position of the center of gravity of the object, and the roller pitch.

1 Claim, 6 Drawing Sheets (a)

(b)

CONVEYANCE DEVICE

CROSS-REFERENCE TO RELATED APPLICATIONS

This is a national phase application based on the PCT International Patent Application No. PCT/JP2011/068948, filed on Aug. 23, 2011, the entire contents of which is incorporated herein by reference.

TECHNICAL FIELD

The present invention relates to a conveyance device that includes drive rollers which are driven to rotate and free rollers which are rotatably provided, and conveys an object by driving the drive rollers to rotate.

BACKGROUND ART

Conventionally, there has been widely used a roller type conveyance device that includes drive rollers which are driven to rotate by appropriate actuators and rotatable free rollers, the drive rollers and the free rollers being arranged thereon, and conveys an object by transmitting the rotational force of the drive rollers to the object (see PTL 1, for example).

In such a conveyance device, in order to prevent an object being conveyed from falling off, the number of rollers arranged thereon is increased to make a gap between the rollers narrow. In addition, in order to prevent an object from slipping on the rollers, the ratio of the drive rollers in all of the rollers is increased.

CITATION LIST

Patent Literature

PTL 1: JP 2009-137688 A

SUMMARY OF INVENTION

Technical Problem

In a conventional roller type conveyance device, when arranging rollers, only reliably conveying an object is focused on, and no particular ingenuity is exercised on the arrangement of rollers. In particular, increasing the number of drive rollers leads to an increase in the number of actuators for driving the drive rollers or the number of driving mechanisms for driving the drive rollers to rotate. As a result, an equipment cost is increased.

Therefore, the present invention aims to provide a conveyance device that reduces an equipment cost by reducing the number of drive rollers arranged thereon while achieving prevention of the falling of an object being conveyed and the idling of the drive rollers.

Technical Solutions

A conveyance device according to one aspect of the present invention is provided with a plurality of conveyance rollers comprising a plurality of drive rollers and a plurality of free rollers, and conveys an object by the conveyance rollers. The conveyance rollers are arranged at a predetermined roller pitch in a conveyance direction, arranged in a plurality of rows so as to be capable of supporting at least side ends of the object, and formed along the conveyance direction by a repetition unit composed of the drive rollers and the free rollers. The roller pitch of the conveyance rollers is set based on the dimension of the object, and the smaller of distances from respective ends in the conveyance direction of the object to the position of the center of gravity of the object. An arrangement ratio of the drive rollers in the conveyance rollers is set based on the smaller of the distances from the respective ends in the conveyance direction of the object to the position of the center of gravity of the object, and the roller pitch. The repetition unit composed of the drive rollers and free rollers is set according to the arrangement ratio of the drive rollers. The conveyance rollers are arranged based on the roller pitch, the arrangement ratio of the drive rollers, and the repetition unit of the conveyance rollers.

In a preferred embodiment of the conveyance device, the conveyance rollers are arranged in a staggered manner along the conveyance direction, the roller pitch satisfies a condition represented by Equation 1, and the arrangement ratio of the drive rollers satisfies a condition represented by Equation 2.

$$P < \frac{2YLXG}{2YL - YG} \quad [\text{Equation 1}]$$

$P$: Roller Pitch $XG$: X Coordinate of Center of Gravity $YG$: Y Coordinate of Center of Gravity $YL$: Width of Object (Length in Direction Perpendicular to Conveyance Direction)

$$R \geq \frac{Quo\left(XL + \frac{P}{2}, P\right) - 1}{Quo\left(XL + \frac{P}{2}, P\right)} \quad [\text{Equation 2}]$$

$R$: Arrangement Ratio of Drive Rollers $P$: Roller Pitch $XL$: Length of Object (Length in Conveyance Direction)

$Quo\left(XL + \frac{P}{2}, P\right)$: Quotient Obtained by Dividing $XL + \frac{P}{2}$ by $P$ In another preferred embodiment of the conveyance device, the conveyance rollers are arranged in a parallel manner along the conveyance direction, the roller pitch satisfies a condition represented by Equation 3, and the arrangement ratio of the drive rollers satisfies a condition represented by Equation 4.

$$P < XG \quad [\text{Equation 3}]$$

$P$: Roller Pitch $XG$: X Coordinate of Center of Gravity

-continued $$R \geq \frac{Quo\ (XL, P) - 1}{Quo\ (XL, P)} \quad \text{[Equation 4]}$$

R: Arrangement Ratio of Drive Rollers
P: Roller Pitch
XL: Length of Object (Length in Conveyance Direction)
Quo (XL, P): Quotient Obtained by Dividing XL by P Advantageous Effects of Invention According to the present invention, it is possible to provide a conveyance device that reduces an equipment cost by reducing the number of drive rollers arranged thereon while preventing the falling of an object being conveyed and the idling of the drive rollers.

DESCRIPTION OF EMBODIMENTS

Figure 1:
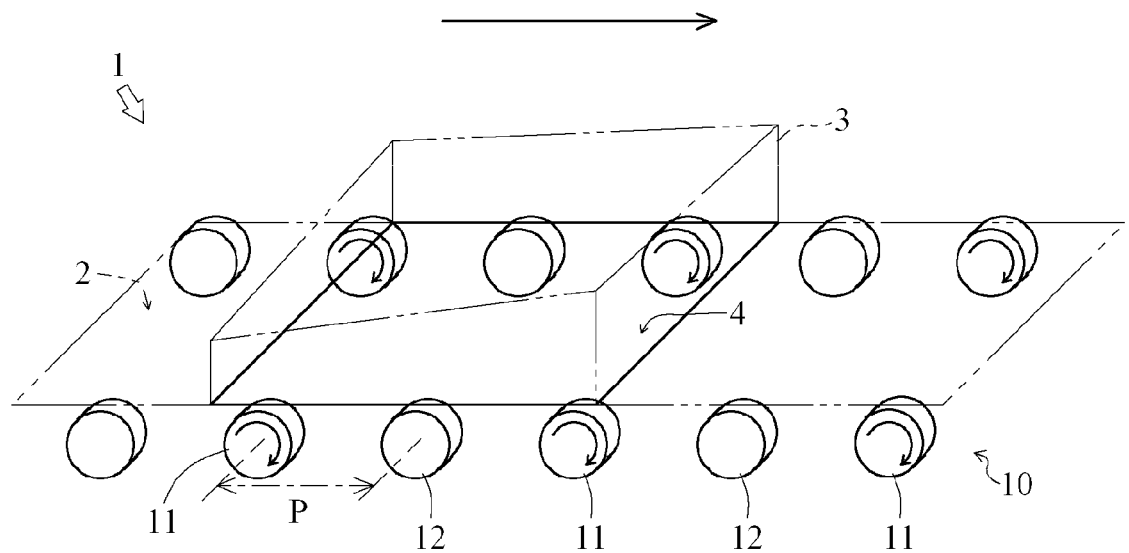
FIG. 1 is a diagram illustrating a conveyance device.

As illustrated in FIG. 1, a conveyance device 1 conveys an object 3 along a conveyance path formed by a conveyance surface 2. The conveyance device 1 is provided with conveyance rollers 10. Roller surfaces of the conveyance rollers 10 constitute the conveyance surface 2. The conveyance rollers 10 convey the object 3, and support the object 3 on the conveyance surface 2.

The conveyance rollers 10 are arranged in a plurality of rows at a predetermined roller pitch P in the conveyance direction. The pitch P is a distance between two conveyance rollers 10 that are adjacent to each other in the conveyance direction in each of the rows. The conveyance rollers 10 are continuously arranged at a predetermined distance (pitch P).

In the present embodiment, there will be described a case where the conveyance rollers 10 are arranged in minimum required two rows so that the conveyance rollers 10 can support the side ends (the ends in the direction that is perpendicular to the conveyance direction) of the object 3.

The conveyance rollers 10 include a plurality of drive rollers 11 and a plurality of free rollers 12. Each of the drive rollers 11 is driven to rotate by an actuator such as a motor. The object 3 on the conveyance surface 2 is conveyed by the rotational force of the drive rollers 11. Each of the free rollers 12 is rotatably supported, and rotates along with the movement of the object 3.

In the conveyance rollers 10, the drive rollers 11 are arranged based on a predetermined arrangement ratio R. The free rollers 12 are arranged based on (1-R) depending on the arrangement ratio R. The arrangement ratio R is a value that indicates the percentage of arranged drive rollers 11 in all of the conveyance rollers 10. The arrangement ratio R is expressed by a fraction with an integer numerator and an integer denominator.

Further, the conveyance rollers 10 are formed by continuously arranging a predetermined repetition unit U in the conveyance direction. The repetition unit U is a minimum constitutional unit of the conveyance rollers 10, and is an integer value that is set based on the arrangement ratio R of the drive rollers 11.

That is, in the conveyance rollers 10, the drive rollers 11 and the free rollers 12 are arranged based on the roller pitch P, the arrangement ratio R, and the repetition unit U.

Figure 2:
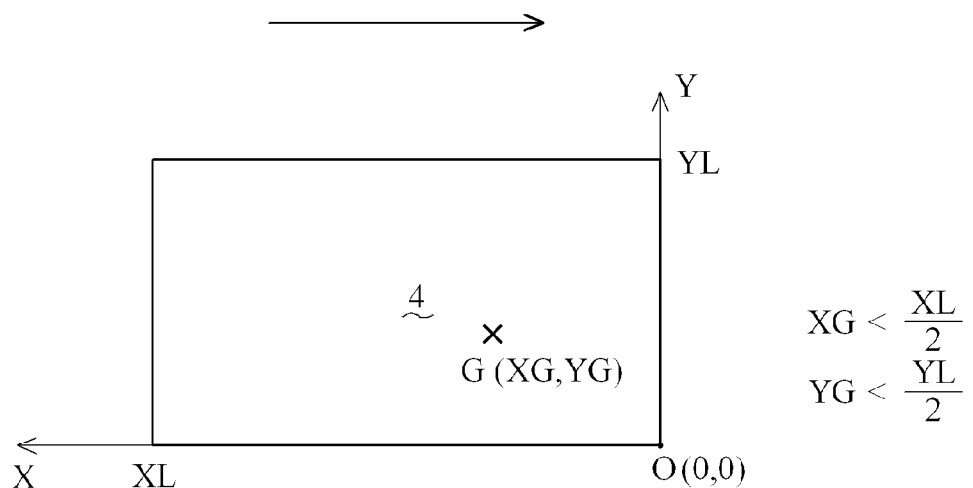
FIG. 2 is a diagram illustrating the position of the center of gravity of an object being conveyed.

As illustrated in FIGS. 1 and 2, the object 3 has a plane 4 which makes surface contact with the conveyance direction 2 of the conveyance device 1. Further, the position of the center of gravity G of the object 3 with the plane 4 facing downward is known. The plane 4 of the object 3 is not necessarily an exact plane as long as being capable of making surface contact with the roller surfaces of the conveyance rollers 10 (the drive rollers 11 and the free rollers 12) arranged in the conveyance path.

As illustrated in FIG. 2, when an origin O (0, 0) is set on the corner on the downstream side in the conveyance direction of the plane 4, an X axis is set in the conveyance direction, and a Y axis is set in the direction that is perpendicular to the conveyance direction, the position of the center of gravity G of the object 3 is expressed by using plane coordinates (XG, YG) on the plane 4.

The plane coordinates of the center of gravity G are uniquely determined depending on the shape or the like of the object 3. For example, in the following description, the center of gravity G is located at a position that is shifted from the center of the plane 4 toward the origin, and satisfies an X coordinate: XG<XL/2 and a Y coordinate: YG<YL/2. In other words, the plane coordinates (XG, YG) of the center of gravity G are set based on the origin O that is one of the corners of the object 3, the one having the shortest distance to the center of gravity G.

The plane 4 has a rectangular shape. The length in the X-axis direction and the length in the Y-direction of the plane 4 are denoted by XL and YL, respectively. When the plane 4 does not have a rectangular shape, the plane 4 can be regarded as having a rectangular shape in the same manner as above by defining a rectangular that is included within the contact interface between the object 3 and the conveyance surface 2.

In the conveyance device 1, the conveyance rollers 10 (the drive rollers 11 and the free rollers 12) are arranged using the position of the center of gravity G of the object 3 so as to prevent the object 3 from falling off as well as the drive rollers 11 from idling.

Hereinbelow, there will be described a method for arranging the drive rollers 11 and the free rollers 12 in two arrangement patterns including a staggered arrangement and a parallel arrangement of the conveyance rollers 10.

[Staggered Arrangement]

Figure 3:
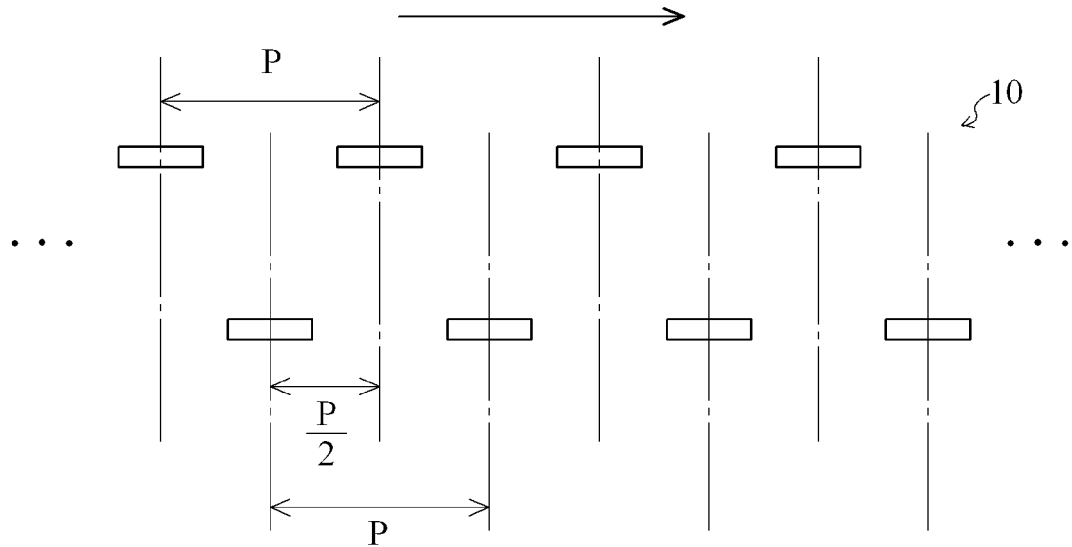
FIG. 3 is a diagram illustrating a staggered arrangement of conveyance rollers.

As illustrated in FIG. 3, when the conveyance rollers 10 are arranged in a staggered manner, the drive rollers 11 and the free rollers 12 are arranged so as to satisfy a condition for preventing the object 3 from falling off and a condition for preventing the drive rollers 11 from idling.

In this regard, "the staggered arrangement" means that the positions of the rotary shafts of the conveyance rollers 10 are displaced in the conveyance direction by a predetermined distance between the respective rows, that is, offset. In the present embodiment, "the conveyance rollers 10 are arranged in a staggered manner" means that the rotary shafts of the conveyance rollers 10 which are arranged in two rows are located so as to be displaced in the conveyance direction by a half pitch P/2 between the two rows.

In order to prevent the object 3 from falling off the conveyance surface 2, it is necessary to support the center of gravity G of the object 3 at at least three points by the conveyance rollers 10. That is, the center of gravity G is required to be surrounded by a triangle formed by three of the conveyance rollers 10.

Figure 4:
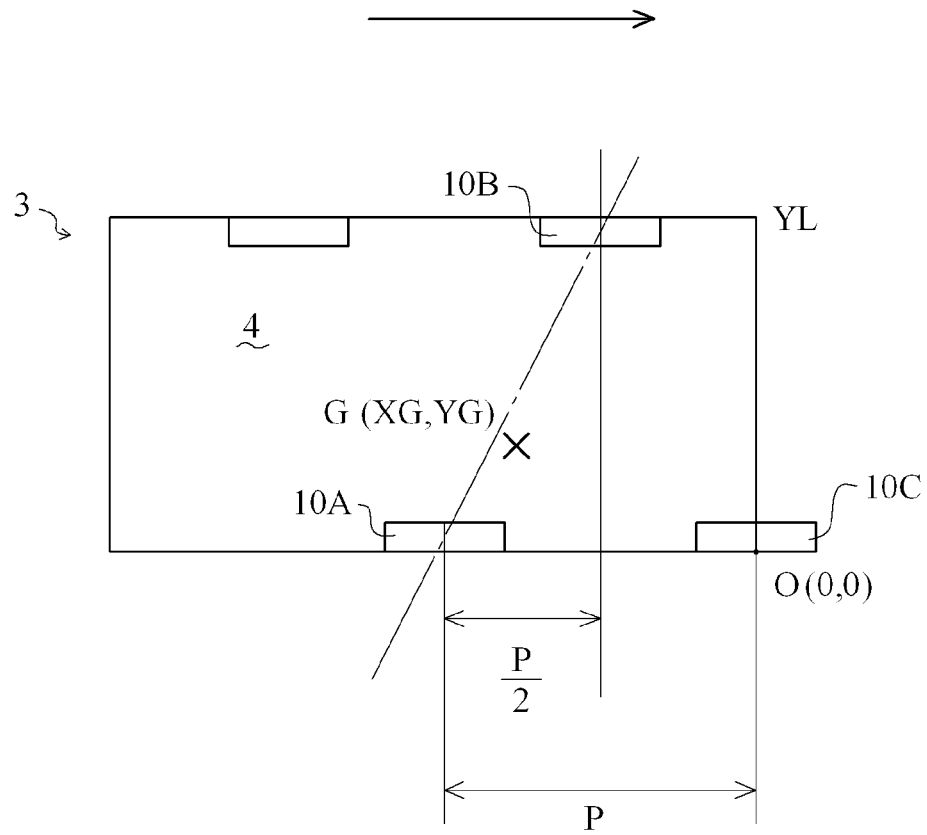
FIG. 4 is a diagram illustrating a condition for preventing an object being conveyed from falling off.

That is, as illustrated in FIG. 4, if the front end surface of the object 3 does not reach a next conveyance roller 10C before the center of gravity G of the object 3 passes through between conveyance rollers 10A and 10B in front, the object 3 falls off.

In this manner, the falling of the object 3 is prevented by setting the pitch P according to the dimension of the object 3 and the position of the center of gravity G thereof.

In this case, the condition is that the pitch P satisfies the following Equation 1.

$$P < \frac{2YLXG}{2YL - YG} \quad \text{[Equation 1]}$$

$P$: Roller Pitch $XG$: X Coordinate of Center of Gravity $YG$: Y Coordinate of Center of Gravity $YL$: Width of Object (Length in Direction Perpendicular to Conveyance Direction)

Figure 5:
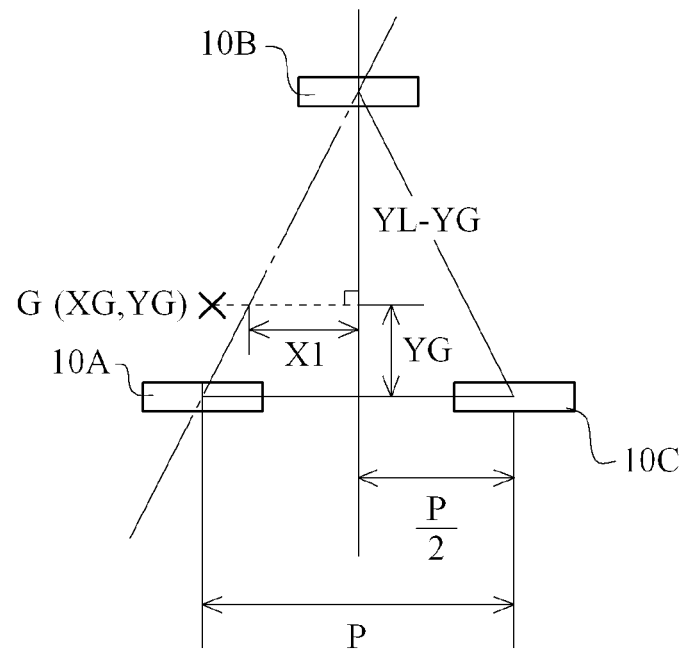
FIG. 5 is a diagram for leading the condition for preventing an object being conveyed from falling off.

As illustrated in FIG. 5, Equation 1 is derived from the following Equation 5 when the X coordinate of a point that is located on a straight line connecting the conveyance roller 10A with the conveyance roller 10B and has a Y coordinate of YG is set to P/2+X1.

$$X1 + \frac{P}{2} < XG \Leftrightarrow P < 2(XG - X1) \quad \text{[Equation 5]}$$

$$X1 : YL - YG = \frac{P}{2} : YL$$

$$\therefore X1 = \frac{P(YL - YG)}{2YL}$$

$$P < \frac{2YLXG}{2YL - YG}$$

The pitch P is determined so as to satisfy the above condition, thereby preventing the object 3 from falling off the conveyance surface 2 which is formed by the conveyance rollers 10.

Next, after setting the pitch P, the arrangement ratio R of the drive rollers 11 in the conveyance rollers 10 is determined so as to satisfy a condition for preventing the object 3 from not being conveyed due to the idling of the drive rollers 11.

In order for the drive rollers 11 to transmit the driving force to the object 3 without idling, when supporting the object 3 by the three conveyance rollers 10A, 10B, and 10C, it is necessary that the conveyance rollers 10A, 10B, and 10C include two or less free rollers 12.

Figure 6:
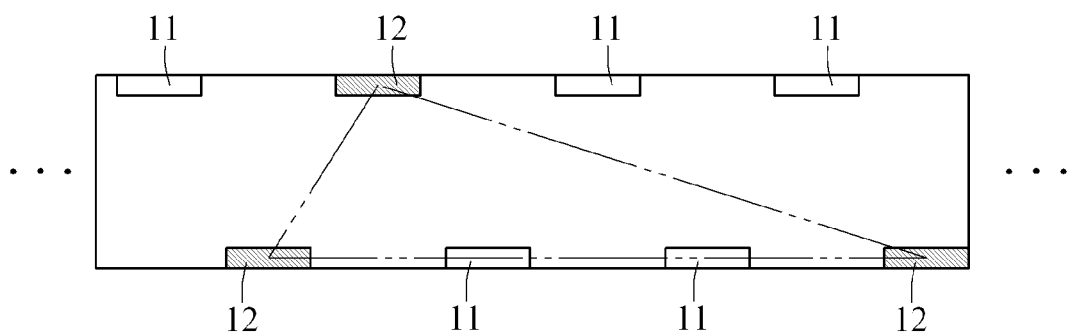
FIG. 6 is a diagram illustrating drive rollers in an idling state.

That is, as illustrated in FIG. 6, even when the number of rollers located under the object 3 is large (eight, for example), the object 3 may not be uniformly loaded on all of the rollers due to an manufacturing error or the like. Therefore, if the object 3 is supported by three free rollers 12, the drive rollers 11 idle. Therefore, if the number of free rollers 12 is not two or less in all conveyance states, the drive rollers 11 may idle.

In this manner, the idling is prevented by determining the arrangement ratio R of the drive rollers 11 so as to restrict the number of free rollers 12 that can be located under the object 3.

In this case, the condition is that the arrangement ratio R of the drive rollers 11 in the conveyance rollers 10 satisfies the following Equation 2.

$$R \geq \frac{Quo\left(XL + \frac{P}{2}, P\right) - 1}{Quo\left(XL + \frac{P}{2}, P\right)} \quad \text{[Equation 2]}$$

$R$: Arrangement Ratio of Drive Rollers $P$: Roller Pitch $XL$: Length of Object (Length in Conveyance Direction)

$Quo\left(XL + \frac{P}{2}, P\right)$: Quotient Obtained by Dividing $XL + \frac{P}{2}$ by $P$ The arrangement ratio R is determined so as to satisfy the condition of Equation 2, and the drive rollers 11 are arranged according to the determined arrangement ratio R. As a result, the idling of the drive rollers 11 is prevented, and the object 3 therefore does not stop in the conveyance path.

Further, the repetition unit U in the conveyance rollers 10 is determined according to the arrangement ratio R determined in this manner. The repetition unit U is a minimum unit of rollers that are continuously arranged in the conveyance direction. For example, the repetition unit U is preferably determined according to the denominator of the arrangement ratio R by taking the conveyance stability of the conveyance rollers 10 into consideration.

Figure 7:
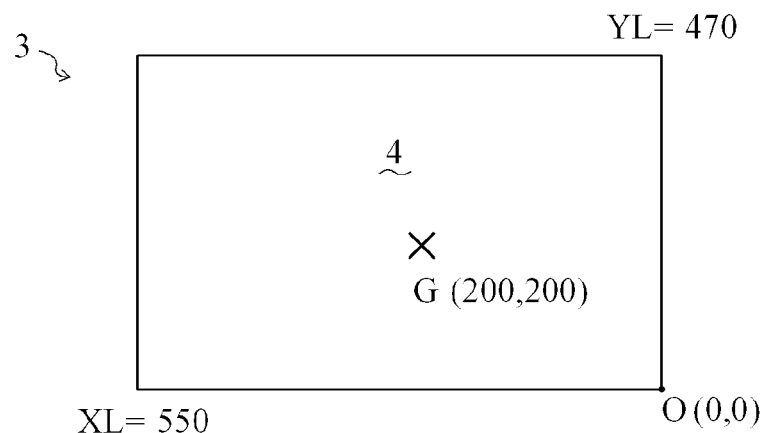
FIG. 7 is a diagram illustrating an example of an object to be conveyed, and a condition for preventing the object from falling off and slipping.
Figure 7:
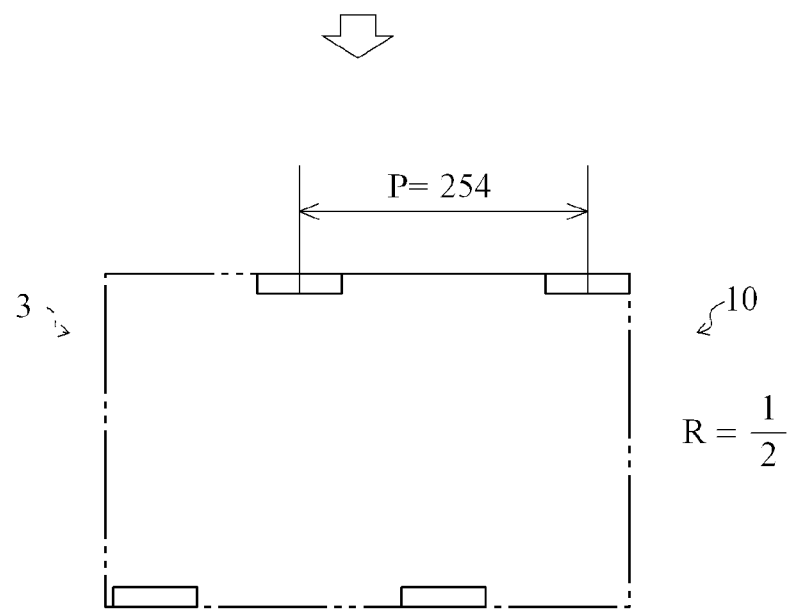

For example, as illustrated in FIG. 7, when the dimension of the plane 4 of the object 3 is XL=550 and YL=470, and the plane coordinates of the center of gravity G of the object 3 are XG=200 and YG=200, the arrangement of the conveyance rollers 10 is as follows.

By substituting the above values into Equation 1, the condition is that the pitch P satisfies P<254.05. In this case, P=254 is determined.

Next, by substituting the pitch P determined as described above and the length XL of the object 3 into Equation 2, the condition is that the arrangement ratio R of the drive rollers 11 is 1/2 or larger. That is, the ratio between the drive rollers 11 and the free rollers 12 which constitute the conveyance rollers 10 is determined as 1:1.

Figure 8:
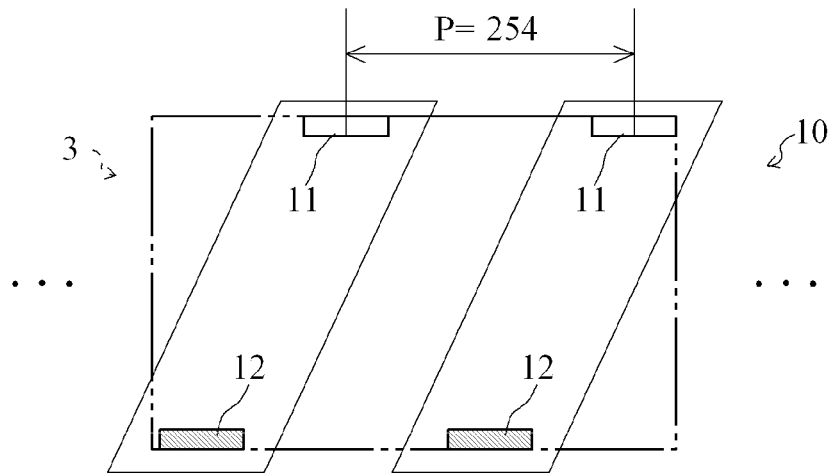
FIGS. 8(a) and 8(b) are diagrams illustrating a repetition unit of the conveyance rollers.
Figure 8:
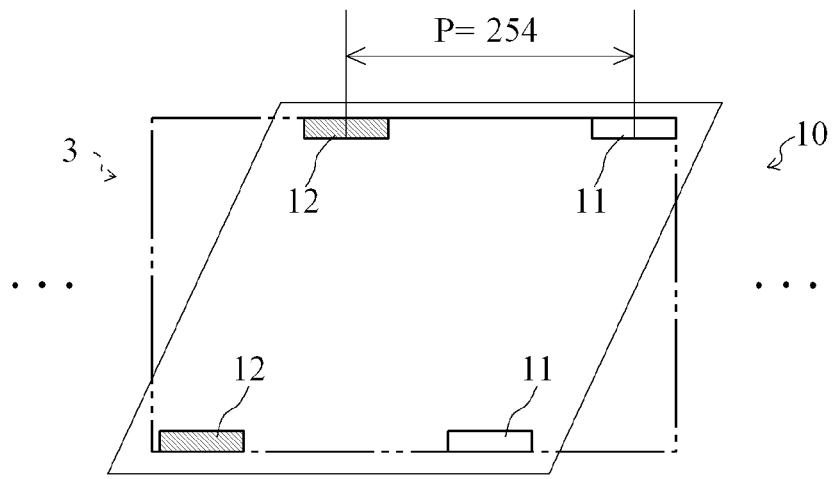

Further, the repetition unit U in the conveyance direction is set according to the arrangement ratio R (=1/2). In this case, the repetition unit U is preferably two or four. As illustrated in FIG. 8(a), when the repetition unit U=2, the drive rollers 11 are arranged as conveyance rollers 10 on one side, and the free rollers 12 are arranged as conveyance rollers 10 on the other side. As illustrated in FIG. 8(b), when the repetition unit U=4, for example, two drive rollers 11 are arranged on the downstream side of the conveyance direction, and two free rollers 12 are arranged on the upstream side thereof. By arranging the drive rollers 11 on the respective sides of the two-row arrangement in this manner, the straight advancing ability can be ensured.

As described above, by arranging the conveyance rollers 10 according to the position of the center of gravity G of the object 3, it is possible to prevent the object 3 from falling off and prevent the drive rollers 11 from idling. In addition, it is possible to minimize the number of drive rollers 11 arranged thereon. Therefore, it is possible to reduce the number of actuators such as motors required for driving the respective drive rollers 11. As a result, an equipment cost can be reduced.

[Parallel Arrangement]

Figure 9:
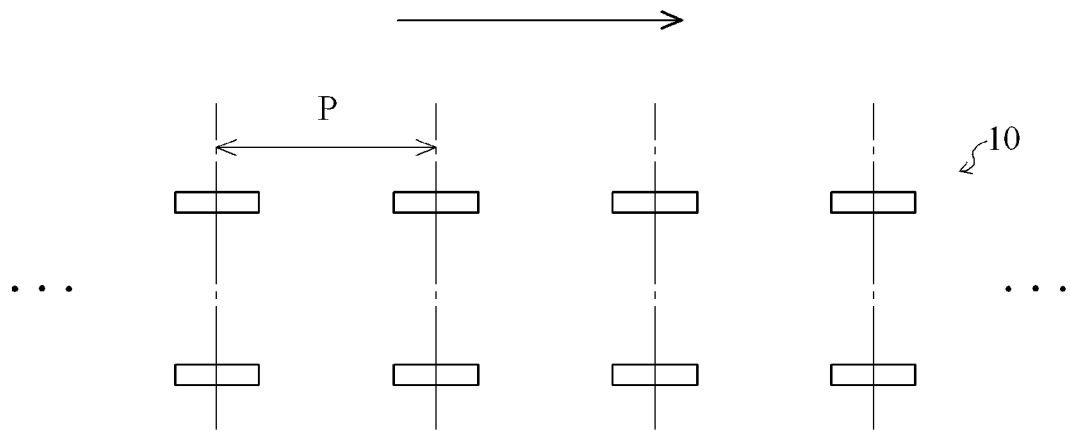
FIG. 9 is a diagram illustrating a parallel arrangement of the conveyance rollers.

As illustrated in FIG. 9, when the conveyance rollers 10 are arranged in a parallel manner, the drive rollers 11 and the free rollers 12 are arranged so as to satisfy a condition for preventing the object 3 from falling off and a condition for preventing the drive rollers 11 from idling.

In this regard, "the parallel arrangement" means that the positions of the rotary shafts of the conveyance rollers 10 are arranged at the same position between the respective rows in the conveyance direction. In the present embodiment, "the conveyance rollers 10 are arranged in a parallel manner" means that the rotary shafts of the conveyance rollers 10 which are arranged in two rows are arranged at the same position between the two rows in the conveyance direction.

Figure 10:
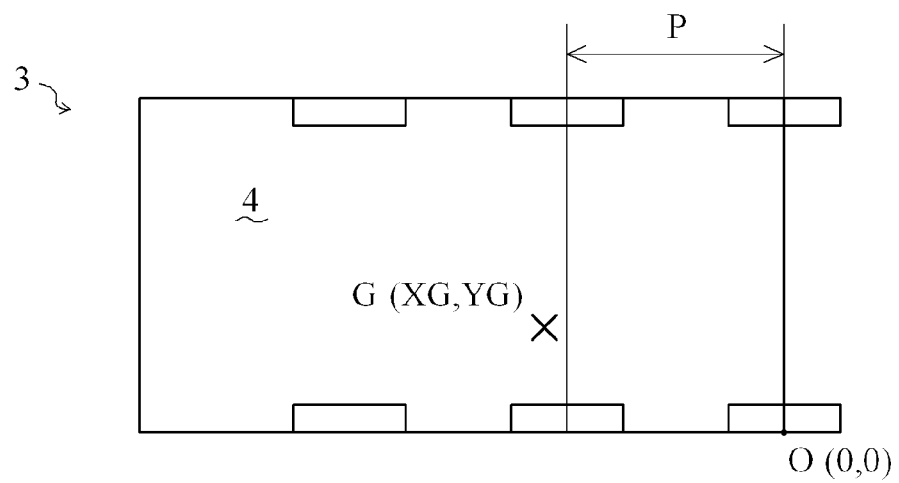
FIG. 10 is a diagram illustrating a condition for preventing an object being conveyed from falling off.

In order to prevent the object 3 from falling off the conveyance surface 2, it is necessary to make the pitch P smaller than the distance XG between the end face of the object 3 and the center of gravity G as illustrated in FIG. 10 (Equation 3).

$$P < XG \quad \text{[Equation 3]}$$

P: Roller Pitch
XG: X Coordinate of Center of Gravity

By setting the roller pitch P in this manner, the object 3 is prevented from falling between rollers that are adjacent to each other in the conveyance direction.

Next, after setting the pitch P in the above manner, the arrangement ratio R of the drive rollers 11 in the conveyance rollers 10 is determined so as to satisfy a condition for preventing the object 3 from not being conveyed due to the idling of the drive rollers 11.

In order for the drive rollers 11 to transmit the driving force to the object 3 without idling, when supporting the object 3 by the three conveyance rollers 10A, 10B, and 10C in the same manner as in the staggered arrangement, it is necessary that the conveyance rollers 10A, 10B, and 10C include two or less free rollers 12.

In this case, the condition is that the arrangement ratio R of the drive rollers 11 in the conveyance rollers 10 satisfies the following Equation 4.

$$R \geq \frac{Quo\ (XL, P) - 1}{Quo\ (XL, P)} \quad \text{[Equation 4]}$$

R: Arrangement Ratio of Drive Rollers
P: Roller Pitch
XL: Length of Object (Length in Conveyance Direction)
Quo (XL, P): Quotient Obtained by Dividing XL by P The arrangement ratio R is determined so as to satisfy the condition of Equation 4, and the drive rollers 11 are arranged according to the determined arrangement ratio R. As a result, the idling of the drive rollers 11 is prevented, and the object 3 therefore does not stop in the conveyance path.

Further, the repetition unit U in the conveyance rollers 10 is determined according to the arrangement ratio R determined in this manner, and the drive rollers 11 and the free rollers 12 are arranged.

As described above, an optimal roller arrangement can be achieved using technical ideas of the present invention in both of the staggered arrangement and the parallel arrangement.

Specifically, the roller pitch P is determined based on the condition for preventing the object 3 from falling off the conveyance surface 2 which is formed by the conveyance rollers 10 based on the position of the center of gravity G of the object 3, and the arrangement ratio R of the drive rollers 11 is determined based on the condition for preventing the drive rollers 11 from idling based on the pitch P. Further, the repetition unit U is determined based on the arrangement ratio R, and the drive rollers 11 and the free rollers 12 are arranged. In this manner, the conveyance device 1 is provided that is capable of preventing the idling of the drive rollers 11 while preventing the falling of the object 3.

Although, the position of the center of gravity G of the object 3 has been described as being known, the position of the center of gravity G may change when a component is assembled to the object 3 or a machining operation is performed thereon while being conveyed by the conveyance device 1. In such a case, it is possible to again determine the plane coordinates of the center of gravity G at the position where the position of the center of gravity G changes, and change the roller pitch P and the arrangement ratio R of the drive rollers 11 to thereby change the arrangement of the conveyance rollers 10.

INDUSTRIAL APPLICABILITY

The present invention can be applied to a roller type conveyance device that includes drive rollers and free rollers and conveys an object by the driving force of the drive rollers.

DESCRIPTION OF NUMERALS

1: Conveyance device
2: Conveyance surface
3: Object
G: Center of gravity of object
10: Roller
11: Drive roller
12: Free roller
P: Pitch between rollers
R: Arrangement ratio of drive rollers
U: Repetition unit of rollers

The invention claimed is:
1. A conveyance device comprising:
a plurality of conveyance rollers comprising a plurality of drive rollers and a plurality of free rollers, the conveyance device conveying an object by the conveyance rollers, wherein the conveyance rollers are arranged at a predetermined roller pitch in a conveyance direction, arranged in two rows so as to be capable of supporting at least side ends of the object, and formed along the conveyance direction by a repetition unit composed of the drive rollers and the free rollers, the roller pitch of the conveyance rollers is set on the basis of the dimension of the object, and the smaller of distances from respective ends in the conveyance direction of the object to the position of the center of gravity of the object, an arrangement ratio of the drive rollers in the conveyance rollers is set on the basis of the smaller of the distances from the respective ends in the conveyance direction of the object to the position of the center of gravity of the object, and the roller pitch, the repetition unit composed of the drive rollers and free rollers is set according to the arrangement ratio of the drive rollers, the conveyance rollers are arranged in a staggered manner along the conveyance direction on the basis of the roller pitch, the arrangement ratio of the drive rollers, and the repetition unit of the conveyance rollers, the roller pitch satisfies a first condition represented by a first equation, Equation 1, $$P < \frac{2YLXG}{2YL - YG} \quad \text{[Equation 1]}$$

$P$: Roller Pitch
$XG$: X Coordinate of Center of Gravity
$YG$: Y Coordinate of Center of Gravity
$YL$: Width of Object (Length in Direction Perpendicular to Conveyance Direction) and, a second condition is satisfied by a second equation, Equation 2, $$R \geq \frac{Quo\left(XL + \frac{P}{2}, P\right) - 1}{Quo\left(XL + \frac{P}{2}, P\right)} \quad \text{[Equation 2]}$$

$R$: Arrangement Ratio of Drive Rollers
$P$: Roller Pitch
$XL$: Length of Object (Length in Conveyance Direction)
$Quo\left(XL + \frac{P}{2}, P\right)$: Quotient Obtained by Dividing $XL + \frac{P}{2}$ by $P$ wherein the arrangement ratio of the drive rollers satisfies the second condition represented by Equation 2.

* * * * *